US005694623A

United States Patent [19]
Akashi

[11] Patent Number: 5,694,623
[45] Date of Patent: Dec. 2, 1997

[54] LINE OF SIGHT DETECTING DEVICE, AND EQUIPMENT COMPRISING THE DEVICE

[75] Inventor: Akira Akashi, Yokohama, Japan

[73] Assignee: Canon Kabushiki Kaisha, Tokyo, Japan

[21] Appl. No.: 428,434

[22] Filed: Apr. 25, 1995

[30] Foreign Application Priority Data

Apr. 28, 1994 [JP] Japan .................. 6-091160

[51] Int. Cl.$^6$ .................................. G03B 17/00
[52] U.S. Cl. .................................. 396/51
[58] Field of Search .................. 354/410, 219, 354/62; 250/201.2; 396/51

[56] References Cited

U.S. PATENT DOCUMENTS

| 4,678,297 | 7/1987 | Ishikawa et al. | 351/208 |
| 5,182,443 | 1/1993 | Suda et al. | 250/201.2 |
| 5,402,199 | 3/1995 | Akashi | 354/410 |
| 5,485,241 | 1/1996 | Irie et al. | 354/410 |

*Primary Examiner*—Safet Metjahic
*Assistant Examiner*—Eric Nelson
*Attorney, Agent, or Firm*—Fitzpatrick, Cella, Harper & Scinto

[57] ABSTRACT

A line of sight detecting device which detects the line of sight of the user. The device includes a determination unit for determining whether the line of sight detection is successful or not. An estimation unit estimates the cause of failure if line of sight detection can not be carried out. A notification unit provides information about the cause of failure of the line of sight detection. The information being estimated by the estimation unit.

38 Claims, 11 Drawing Sheets

LINE OF SIGHT DETECTING DEVICE, AND EQUIPMENT COMPRISING THE DEVICE

BACKGROUND OF THE INVENTION

1. Field of the Invention

The present invention relates to a line of sight detecting device for detecting the line of sight of a user, and an equipment comprising the line of sight detecting device.

2. Related Background Art

Conventionally, various types of so-called line of sight (visual axis) detecting devices for detecting the position, where a user gazes, on an observation surface (e.g., the finder screen of a single-lens reflex camera) have been proposed.

For example, U.S. appln. Ser. No. 08/331,954 (allowed) discloses a camera which picks up an image of the front eye portion of an eye ball of a user illuminated with light emitted by an infrared light-emitting diode (to be abbreviated as an "IRED" hereinafter) using an area sensor, detects the coordinate position of the line of sight, on the finder screen, of the user by processing the image signal, and selects one of a plurality of distance measuring (focus detection) areas or photometric areas of the camera on the basis of the detection result.

FIG. 13B shows an example of an image signal output from the area sensor when an image of the eye ball is picked up. FIG. 13A visually expresses an eye ball image signal, and a signal 60 in FIG. 13B represents a change in output of the image signal at the position of a line X–X' in FIG. 13A.

FIG. 13A illustrates a pupil 50, and corneal reflection images (Purkinje-Sanson images) 51 of the IRED. With the above-mentioned detection method, the relative positional relationship between the center of the pupil and the corneal reflection images can be detected from this signal, and the coordinate position of the line of sight of a user can be detected. Two peaks in the signal 60 correspond to the corneal reflection images of the IRED.

FIG. 14 shows an example of a conventional finder of a camera which comprises the line of sight detecting device.

A liquid crystal display (LCD) 24 is arranged in a field mask 23, and includes an in-focus indication of a focus detecting device of the camera, a charging end indication of an electronic flash, indications of a shutter (Tv) value and aperture (Av) value by 7-segment indicators, a line of sight mark 24a, and the like.

The line of sight mark 24a is used for indicating a line of sight detection possible (successful)/impossible (failure) state of the line of sight detecting device of the camera.

Such a mark is required since the line of sight cannot always be reliably detected because the object to be detected by the line of sight detecting device is the eye of a man. For example, when a user closes his or her eyes, it is impossible to detect the line of sight, as a matter of course. Even when a user does not close his or her eyes, it becomes difficult to detect the line of sight if the user opens his or her eyes only slightly. As in a known focus detecting device, a device which does not operate with a reliability of 100% must indicate a failure operation state.

When the line of sight detection is successful, the mark 24a is turned on; otherwise, the mark 24a flashes, thus indicating the success/failure state of the line of sight detection.

The success/failure state is discriminated based on the reliability of the line of sight detection result. Since the principle of the line of sight detection is based on pupil information in the eye ball image and corneal reflection image information of the IRED, the changes in signals (or contrasts of the signals) of the pupil and the corneal reflection images in the signal can be used as criteria for determining the reliability of the detection result. More specifically, if the contrasts of the signals of the pupil portion and the corneal reflection image portions are sufficient, it is determined that the reliability of the line of sight detection result is high; otherwise, it is determined that the reliability is low.

Therefore, the user can recognize that the line of sight detection is successful if the mark 24a is turned on in the finder; or that the line of sight detection is failed if the mark 24a flashes.

However, with the above-mentioned indication, the user of the camera can only recognize that the line of sight detection is failed, but cannot know how to cope with it.

More specifically, failure (impossible) of line of sight detection occurs due to various causes. Such causes include those that the user can easily cope with if he or she can find them. However, when only the detection result is indicated like in the above-mentioned prior art, the user cannot find its cause, and often gives up the line of sight detection.

The present invention has been made in consideration of the above-mentioned prior art, and has as its object to provide a line of sight detecting device which can perform line of sight detection with a high percentage of success, and an equipment comprising the device.

SUMMARY OF THE INVENTION

One aspect of this invention comprises determination means for determining whether or not line of sight detection is failed. When the determination means determines that the line of sight detection is not successful, the cause of the failure of line of sight detection is estimated, and information associated with the estimated cause is informed to a user or a person to be examined. As a result, the user or person to be examined can know the cause of the failure of line of sight detection, and can achieve successful line of sight detection by removing the cause.

DESCRIPTION OF THE PREFERRED EMBODIMENTS

Figure 1A:
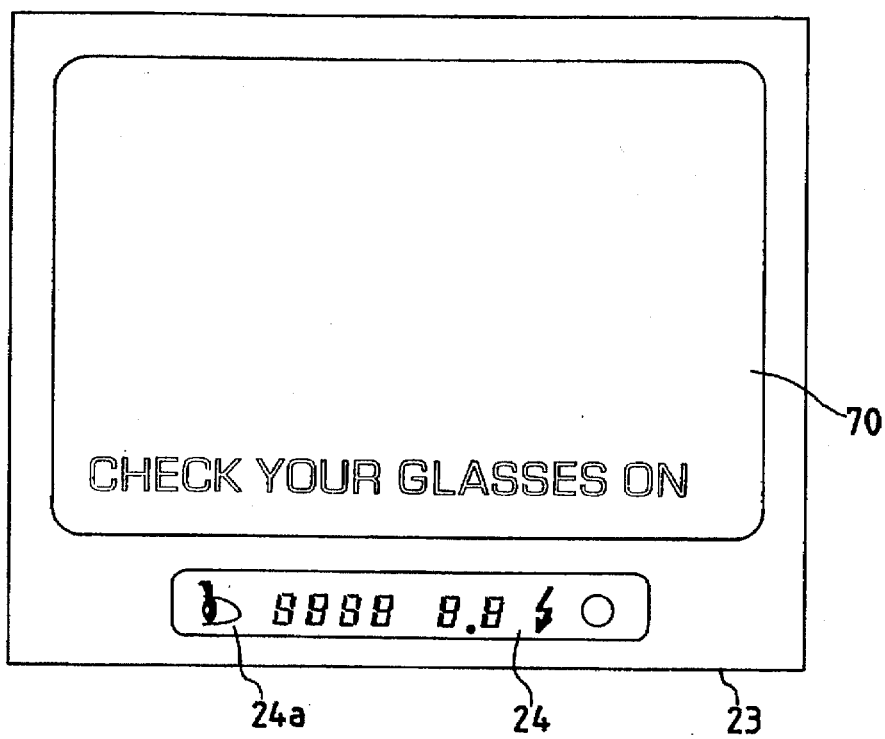
FIGS. 1A and 1B are views for explaining the first embodiment of an indication mode (finder indication of a camera) according to the present invention.
Figure 1B:
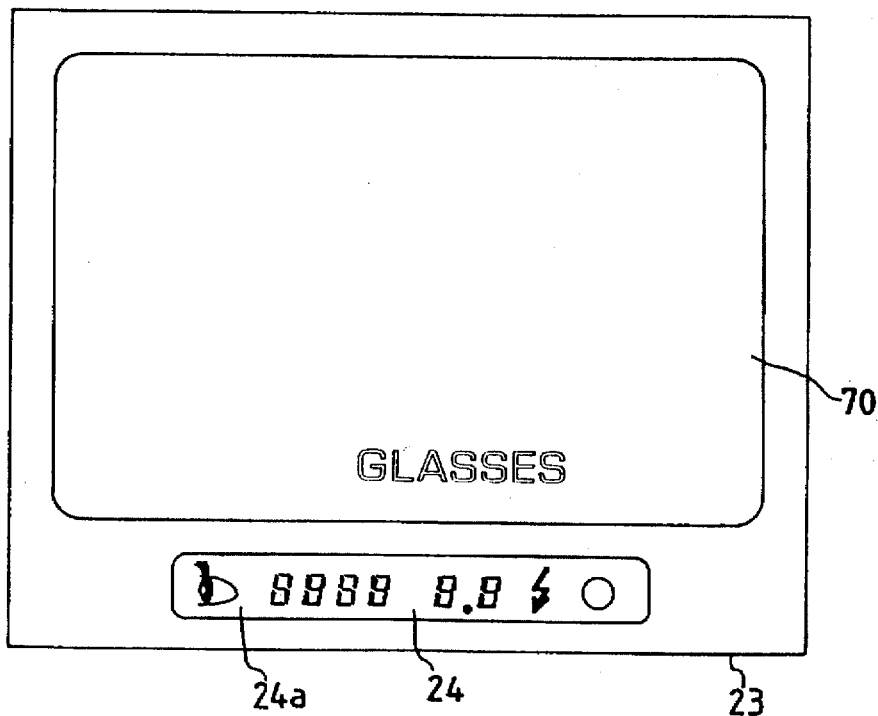

FIGS. 1A and 1B show the first embodiment of an indication mode of the present invention.

Figure 14:
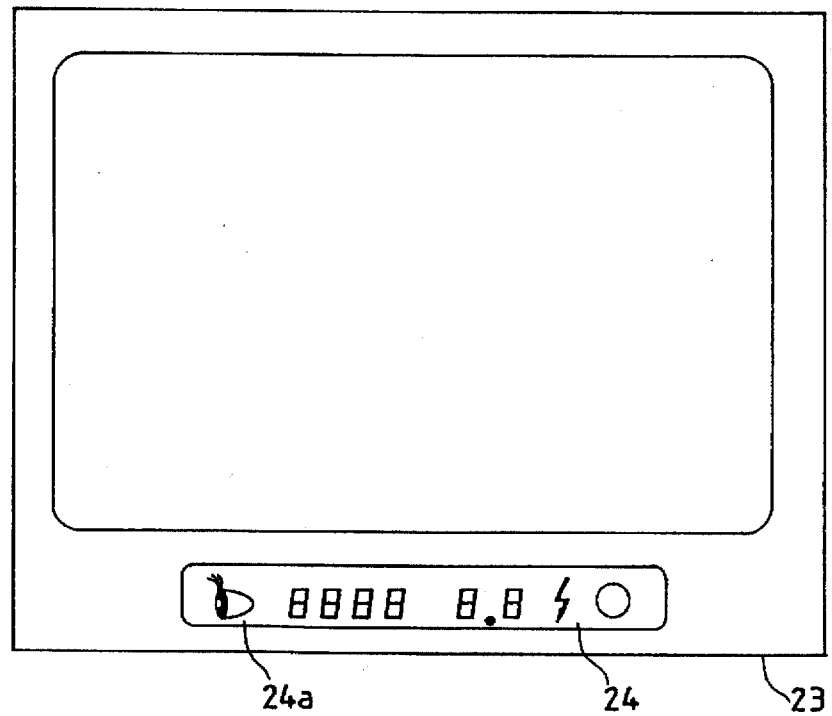
FIG. 14 is a view for explaining the prior art of a finder indication of a camera having a line of sight detecting device.

The same reference numerals in FIGS. 1A and 1B denote the same parts as in FIG. 14.

In this embodiment, a superimpose indication 70 as information means is indicated in a finder as an observation surface. This embodiment assumes a case wherein a user who wears glasses uses a camera, light emitted from an IRED for illuminating an eye ball is reflected by the glasses, and the reflected light makes line of sight detection impossible.

Figure 2:
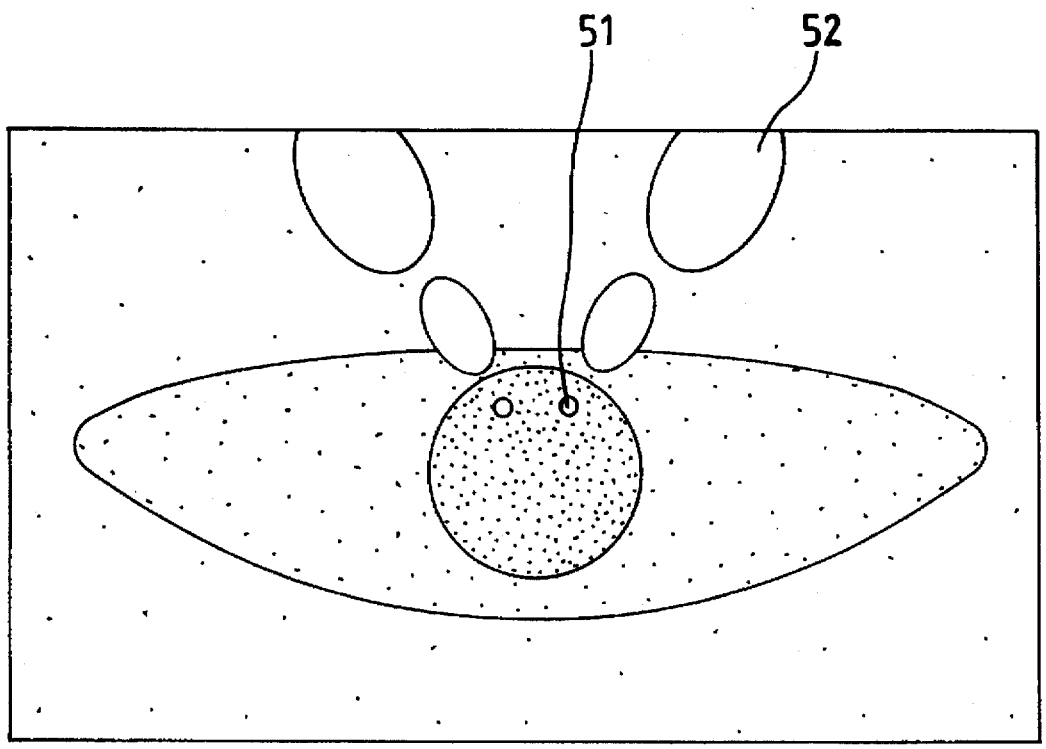
FIG. 2 is a view for explaining an eye ball image signal which may make line of sight detection impossible.

FIG. 2 shows an example of an eye ball image signal at that time. In addition to original corneal reflection images 51, many reflection images 52 of the IRED caused by the glasses (to be referred to as "glass reflection images" hereinafter) are generated. When a user wears glasses, in a state worse than the illustrated state, the glass reflection images 52 may overlap the corneal reflection images 51. In such a state, the original corneal reflection images 51 can no longer be detected, and it becomes impossible in principle to detect the line of sight.

In order to prevent this, the camera can request a user to re-wear the glasses normally.

When determination means determines that line of sight detection has failed since original corneal reflection images cannot be extracted, if glass reflection images are detected in the image signal, estimation means estimates that the cause of failure of line of sight detection is irregular reflection by the glasses, and indicates a message "CHECK YOUR GLASSES ON" as the superimpose indication 70, as shown in FIG. 1A. Alternatively, only a message "GLASSES" may be indicated, as shown in FIG. 1B, so as to inform the user that the cause of failure of line of sight detection is the glasses.

In order to realize such a superimpose indication, a transmission type liquid crystal display may be placed on, e.g., the focusing plate of a camera. Alternatively, a light projection optical system may be arranged on the bottom or side surface of a so-called mirror box below a main mirror 2 of the camera, and a character pattern may be optically projected onto the focusing plate.

Figure 3:
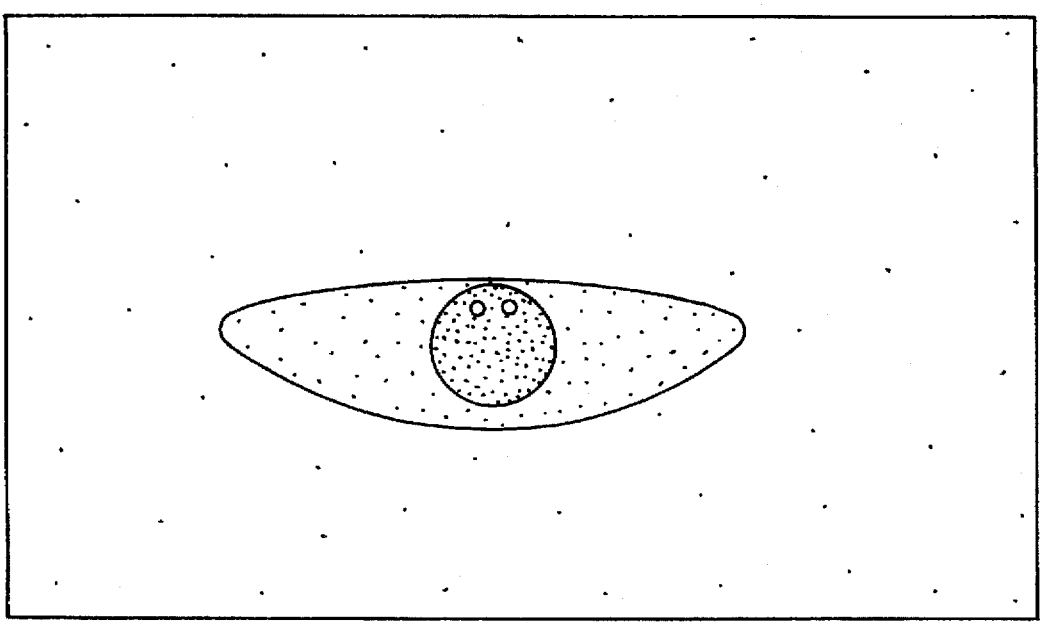
FIG. 3 is a view for explaining an eye ball image signal which may make line of sight detection impossible.
Figure 13A:
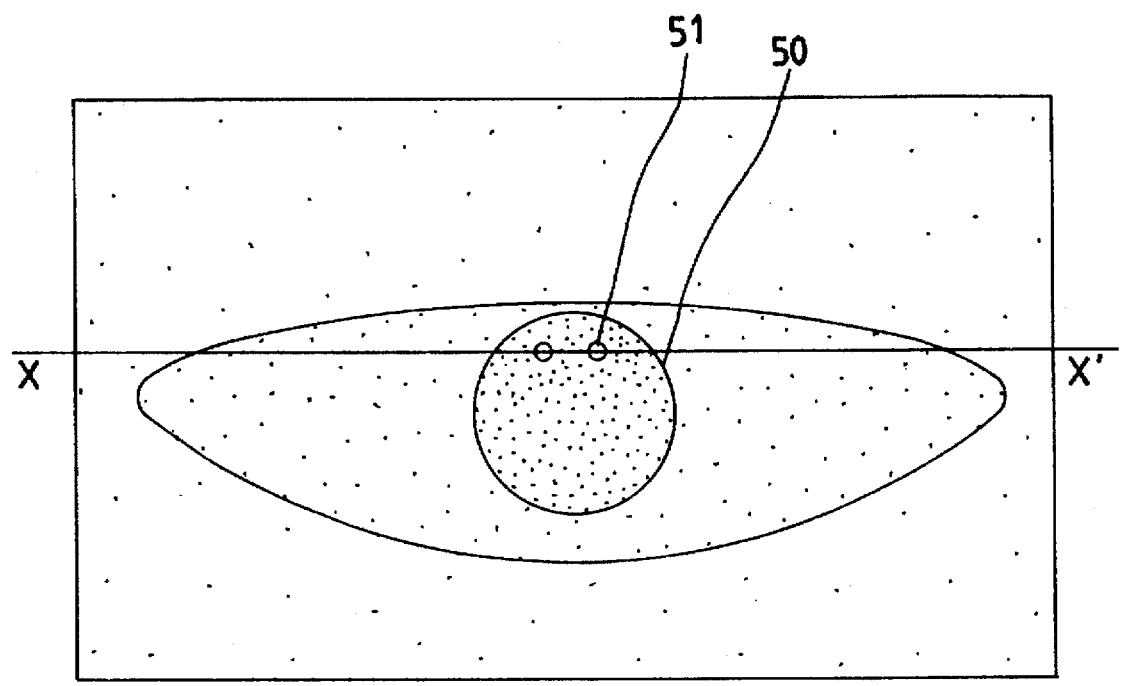
FIGS. 13A and 13B are views for explaining an example of an eye ball image signal that explains the principle of line of sight detection.
Figure 13B:
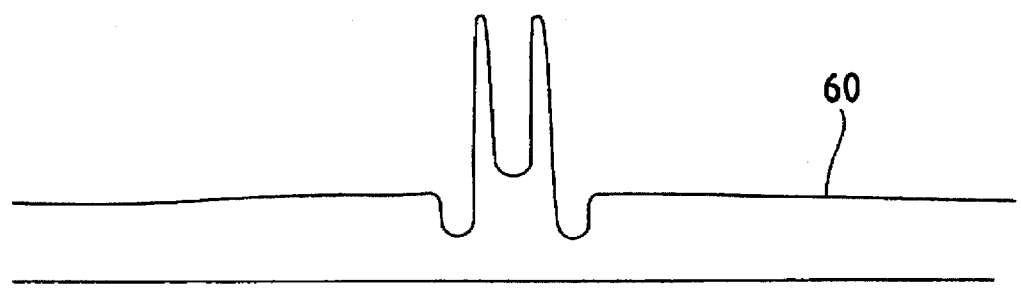

FIG. 3 shows an example of an eye ball image signal obtained when the eye of a user is separated from the camera by a relatively large distance. Since the eye of the user is separated from the camera by a relatively large distance, the sizes of the pupil and corneal reflection images become small relative to those in FIG. 13A. When the eye is separated farther from the camera, illumination by the IRED becomes dark, and the contrast of the eye ball image signal becomes small. In this state, it becomes difficult to identify the iris and pupil, and the reliability of the line of sight detection result is lowered.

In such a case, since the reliability can be improved when the user moves his or her eye closer to the camera, a message "PUT YOUR EYES ON" or "YOUR EYES ARE TOO FAR" is indicated as the superimpose indication to inform the user that the failure of line of sight detection is caused by the eye ball position too far from the camera.

On the other hand, since detection is also disabled when the eye is too near the camera, a message "PUT YOUR EYES OFF" or "YOUR EYES ARE TOO NEAR" is indicated to inform the user that the eye ball is too near the camera.

When the determination means determines that the line of sight detection is failed due to an insufficient contrast in the signal, the estimation means can estimate that the cause is an improper distance between the eye and the camera by calculating the distance from the interval between the two corneal reflection images. When the distance between the two reflection images is equal to or larger than a predetermined value, it can be estimated that the eye is too near; otherwise, it can be estimated that the eye is too far.

Figure 4:
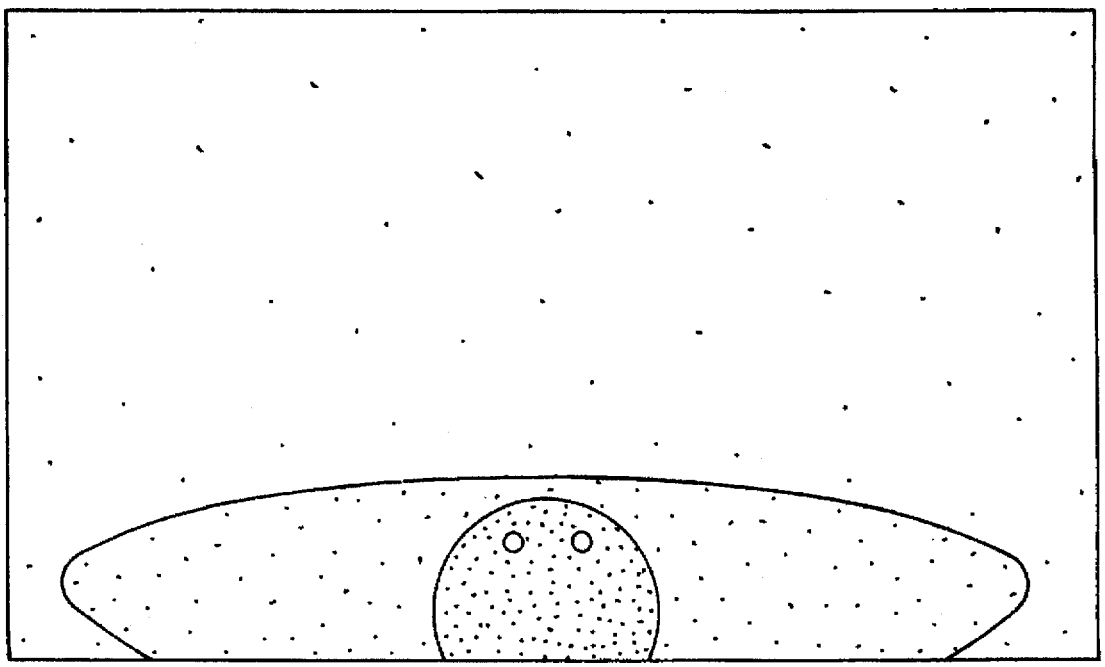
FIG. 4 is a view for explaining an eye ball image signal which may make line of sight detection impossible.

FIG. 4 shows an example of an image signal obtained when the entire area of an image of the front eye portion of the eye ball is not formed on the area sensor since a user does not look at the center of the finder.

In this case, since the image signal of the entire eye ball cannot be obtained, the pupil cannot be extracted in a circular pattern. More specifically, the line of sight detection becomes impossible since the center of the pupil cannot be accurately detected.

Since it is estimated that this problem can be solved when the user normally looks at the center of the finder, when the pupil cannot be extracted in a circular pattern, for example, a message "MAKE SURE THAT YOUR EYES ARE IN PLACE" is indicated.

Figure 5A:
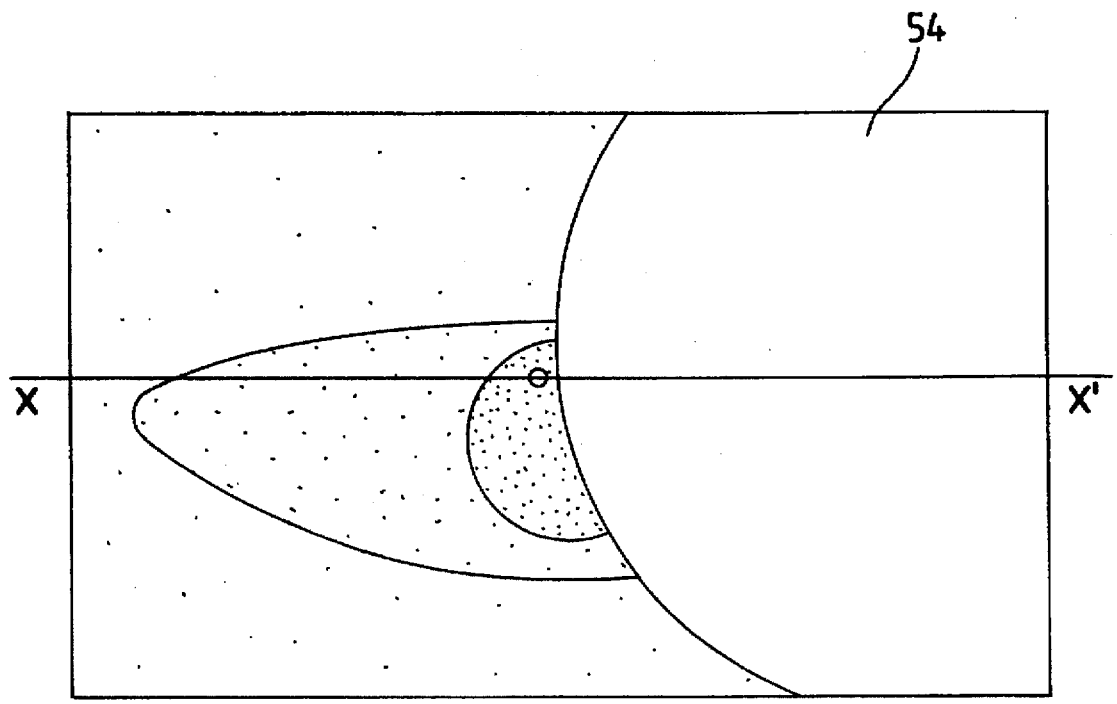
FIGS. 5A and 5B are views for explaining an eye ball image signal which may make line of sight detection impossible.
Figure 5B:
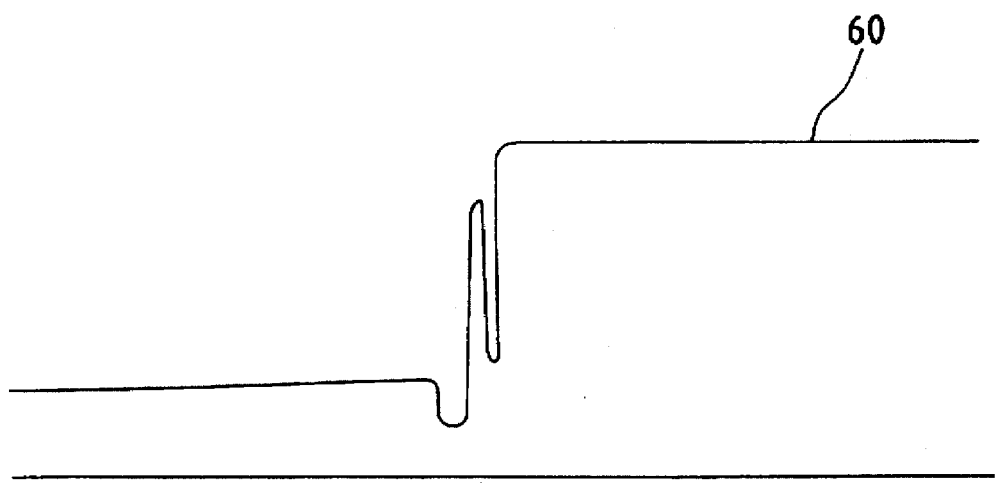

FIGS. 5A and 5B show an example of an image signal obtained when sunlight is directly incident on a portion near the finder while the camera is used outdoors. When sunlight is directly irradiated onto the finder or the eye of a user who looks into the finder, the luminance of the irradiated portion considerably increases, and a direct sunlight area 54 is formed, as shown in FIG. 5A. In this case, the image signal is saturated like a signal 60 shown in FIG. 5B, and the line of sight detection becomes impossible.

When a wide saturated area is generated in the image signal, since the above-mentioned cause is estimated, a message "SUNSHINE" is indicated to inform the user that the cause of the failure of line of sight detection is the sunlight. Alternatively, a message "SHADE FROM THE SUN" may be indicated to inform the operator of a method of removing the cause of the failured detection.

Figure 6:
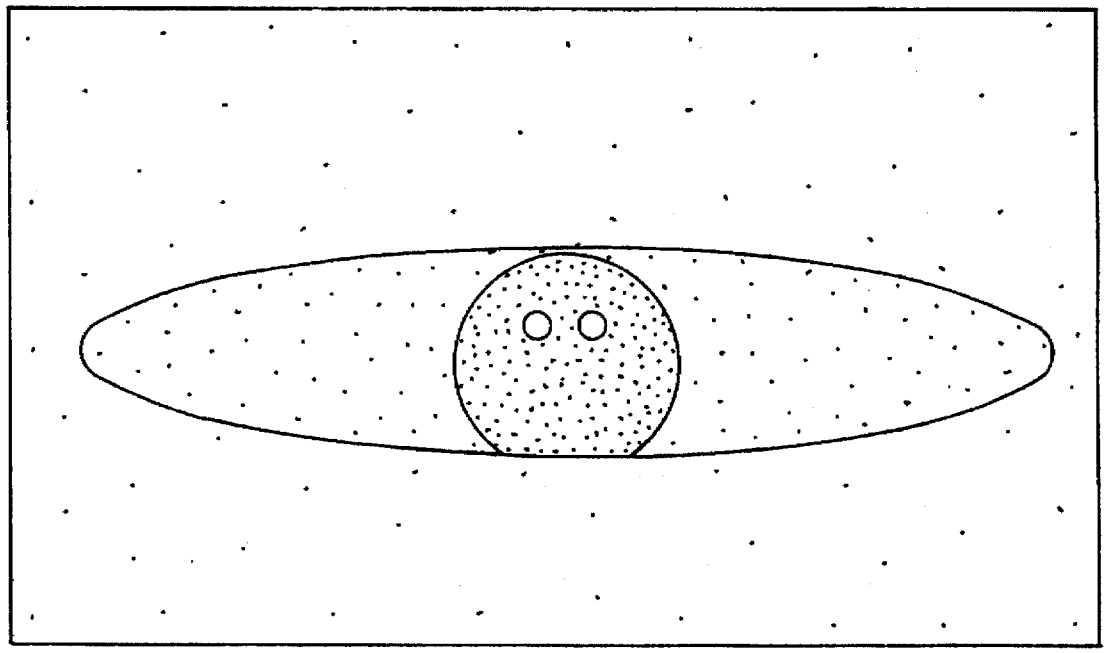
FIG. 6 is a view for explaining an eye ball image signal which may make line of sight detection impossible.
Figure 8:
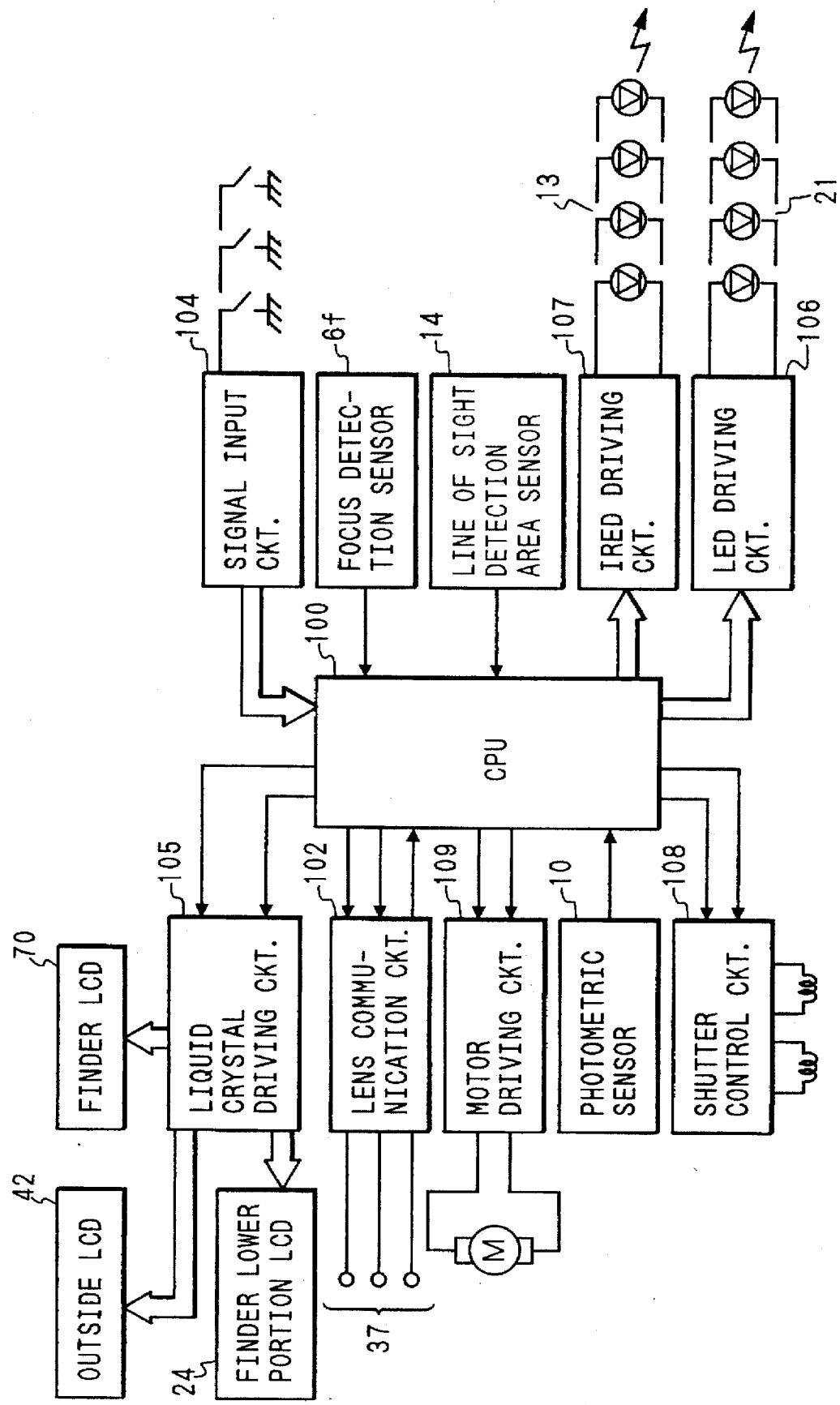
FIG. 8 is a circuit diagram showing an electrical circuit according to the first embodiment of the present invention.

FIG. 6 shows an example of an image signal obtained when the pupil cannot be normally extracted due to the eyelid. As shown in FIG. 8, when the pupil cannot be extracted in a circular pattern, and is not present near the center of the screen, it can be estimated that this situation is different from that in FIG. 4. In this case, a message "OPEN YOUR EYES MUCH MORE" can be indicated to urge the user to open his or her eyes more.

Figure 7:
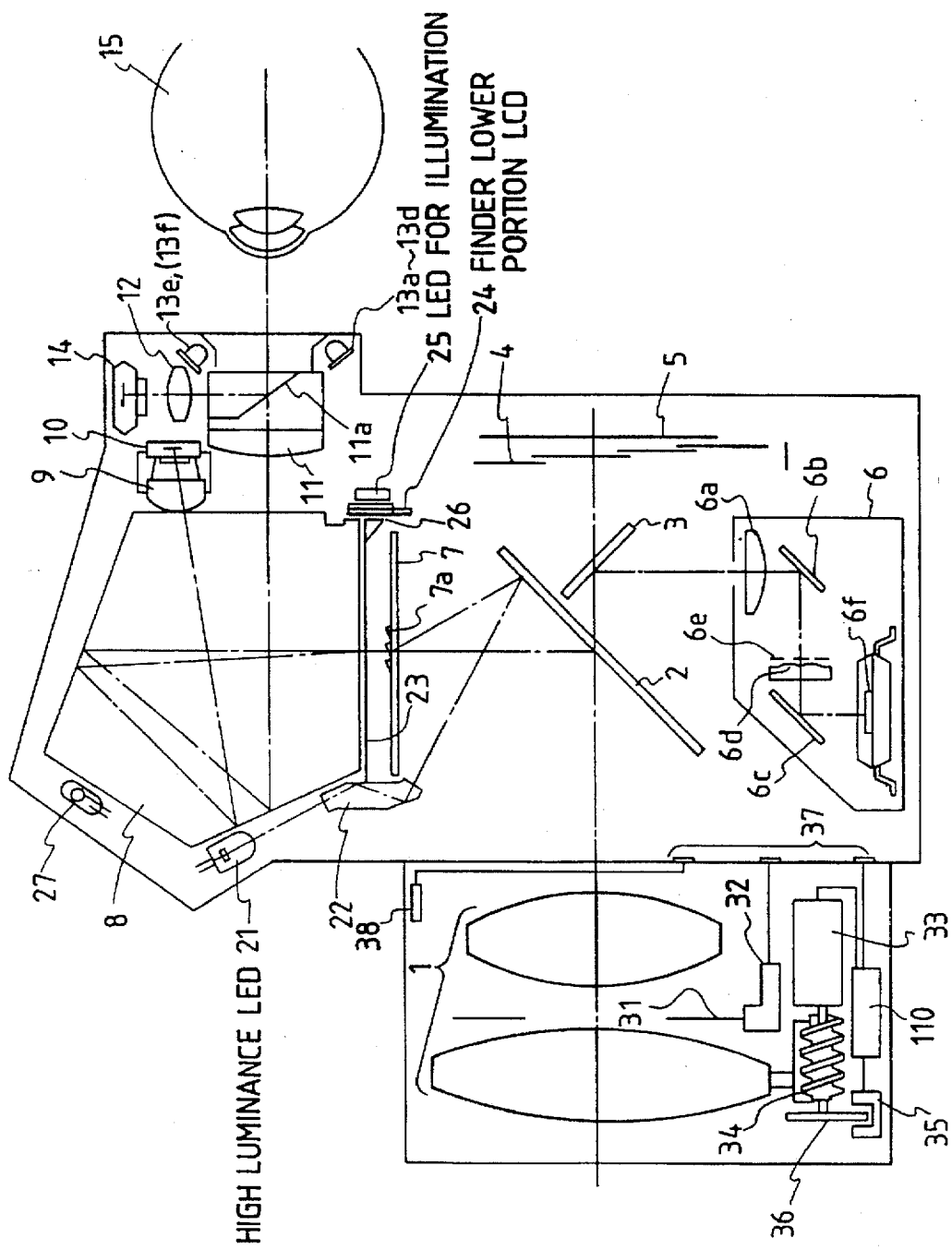
FIG. 7 is a schematic sectional view showing the arrangement of principal part of a camera according to the present invention.

FIG. 7 is a schematic sectional view showing the arrangement of principal part of a single-lens reflex camera to which the present invention is applied.

Referring to FIG. 7, a photographing lens 1 illustrated in FIG. 7 is constituted by two lenses for the sake of simplicity.

However, in practice, the photographing lens 1 is constituted by a larger number of lenses. A main mirror 2 selects the observation or photographing state of an object image by a finder system when it is obliquely inserted in or retracted from the photographing optical path. A sub mirror 3 reflects some light components of a light beam transmitted through the main mirror 2 toward a focus detection unit 6 in a lower portion of the camera body.

A shutter 4 is arranged behind the mirrors 2 and 3. A photosensitive member 5 may comprise a solid-state image pickup element such as a CCD or a MOS device, or an image pickup tube such as a VIDICON in addition to a silver halide film.

The focus detection unit 6 is constituted by a field lens 6a arranged near the imaging plane, reflection mirrors 6b and 6c, a secondary imaging lens 6d, an aperture 6e, a line sensor 6f, and the like. The focus detecting device of this embodiment adopts a known phase difference detection system. However, since the focus detection device is not directly related to the present invention, no more description thereof will be given herein.

A known focusing plate 7 and a pentagonal prism 8 are arranged in an upper portion of the camera body. An imaging lens 9 and a photometric sensor 10 are used for measuring the object luminance in the observation screen. The imaging lens 9 establishes a conjugated relationship between the focusing plate 7 and the photometric sensor 10 via the reflection optical path in the pentagonal prism 8.

An eye piece lens 11 with a beam splitter 11a is arranged behind the exit surface of the pentagonal prism 8, and is used for observing the focusing plate 7 by an eye 15 of a photographer. The beam splitter 11a comprises, e.g., a dichroic mirror for transmitting visible light therethrough and reflecting infrared light.

A light-receiving lens 12 is arranged above the eye piece lens 11. An area sensor 14 comprises a two-dimensional array of photoelectric elements such as CCDs, and is arranged at a position conjugate with a position near the pupil of the eye 15 of the photographer, which is located at a predetermined position with respect to the light-receiving lens 12. Six IREDs 13a to 13f serve as illumination light sources.

The eye piece lens 11, the light-receiving lens 12, the IREDs 13a to 13f, and the area sensor 14 constitute elements of detecting means for detecting a line of sight in this embodiment.

Light emitted by each of finder superimpose LEDs 21 is reflected by the main mirror 2 via a light projection prism 22, is deflected in the vertical direction by micro prisms 7a formed on a display portion of the focusing plate 7, and reaches the eye 15 of the photographer via the pentagonal prism 8 and the eye piece lens 11.

The micro prisms 7a are formed in a frame pattern at positions corresponding to a plurality of focus detection areas on the focusing plate 7, and are respectively illuminated with light emitted from the five corresponding superimpose LEDs 21.

With this arrangement, five distance measuring point marks (not shown) shine in the finder field, and focus detection areas (distance measuring areas) can be indicated.

A field mask 23 forms a finder field area. A finder lower portion LCD 24 is used for indicating photographing information on a portion outside the finder field, and is illuminated from behind by light emitted by an LED 25 for illumination.

Light transmitted through the LCD 24 is guided into the finder field by a triangular prism 26, and indications (24 in FIG. 1A) are made on the lower portion of the finder field. With these indications, the photographer can know photographing information.

The photographing lens 1 includes an aperture 31, an aperture driving device 32 including an aperture driving circuit 111 (to be described later), a lens driving motor 33, a lens driving member 34 including a driving gear, and a photointerrupter 35 for detecting the rotation of a pulse plate 36 interlocked with the lens driving member 34, and supplying the detected information to a lens focus adjusting circuit 110. The focus adjusting circuit 110 drives the lens driving motor by a predetermined amount on the basis of this information and information of a lens driving amount sent from the camera side, thereby moving the photographing lens 1 to an in-focus position. Mount contacts 37 serve as a known interface between the camera and the lens.

FIG. 8 is a circuit diagram showing an electrical circuit of the camera according to the first embodiment of the present invention. The same reference numerals in FIG. 8 denote the same parts as in FIG. 7.

A microcomputer (to be abbreviated as a "CPU" hereinafter) 100 is connected to a line of sight detection area sensor 14, the photometric sensor 10, the focus detection sensor 6f, a signal input circuit 104, an LCD driving circuit 105, an LED driving circuit 106, an IRED driving circuit 107, a shutter control circuit 108, and a motor driving circuit 109. The CPU 100 exchanges signals with the photographing lens via a lens communication circuit 102 and the mount contacts 37 shown in FIG. 7.

Since the details of the photometric sensor 10, the focus detection sensor 6f, the signal input circuit 104, the shutter control circuit 108, the motor driving circuit 109, and the lens communication circuit 102 are not directly related to the present invention, no further explanation will be given.

The CPU 100 incorporates a ROM which stores a program for executing a camera operation, a RAM for storing variables, and an EEPROM (electrically erasable programmable read-only memory) for storing parameters.

The line of sight detection area sensor 14 photoelectrically converts an eye ball image of a user formed on the sensor surface by a line of sight detection optical system (the eye piece lens 11 and the light-receiving lens 12 in FIG. 7), and supplies the electrical signal to the CPU 100. The CPU 100 A/D-converts the input electrical signal, and stores converted image data in the RAM. The CPU 100 executes signal processing of the image data in accordance with a predetermined algorithm stored in the ROM to detect characteristic points (pupil and corneal reflection images) of the eye ball image required for line of sight detection, and calculates the line of sight of the photographer on the basis of the information of the characteristic points. At the same time, the CPU 100 determines whether the line of sight detection is possible or impossible. If the CPU 100 determines that the line of sight detection is impossible, it estimates the cause of the impossibility detection, and supplies an instruction to the LCD driving circuit 105.

The signal input circuit 104 is a circuit for supplying the states of various switches of the camera to the CPU. The switches include switches which are respectively turned on at the first and second stroke positions of a release button (not shown), an AE lock switch which is turned on upon depression of an AE lock button (not shown), and the like.

The LED driving circuit 106 controls to turn on or to flash the above-mentioned superimpose LEDs 21. The IRED driving circuit 107 selectively turns on the six IREDs 13a to 13f (FIG. 7) as needed.

The LCD driving circuit 105 can indicate an aperture value, shutter speed, selected photographing mode, and the like on an external LCD 42 arranged on the outer surface of the camera, and the finder lower portion LCD 24 arranged in the finder lower portion in accordance with an instruction from the CPU 100. Furthermore, the LCD driving circuit 105 is also connected to a finder LCD 70, and indicates a message indicating the situation in the finder, as shown in FIG. 1A, when the line of sight detection is impossible.

The operation associated with line of sight detection of the camera according to the present invention with the above-mentioned arrangement will be briefly described below.

When the operation of the camera is started upon depression of the release button (not shown), the CPU 100 starts a focus detection operation, a photometric operation, and a line of sight detection operation.

To achieve the line of sight detection, the CPU 100 turns on proper IREDs for illuminating the eye ball of a user, and acquires eye ball image data from the line of sight detection area sensor 14. The CPU 100 performs signal processing of the image signal to extract characteristic points (pupil and corneal reflection images) in the eye ball image, and detects the coordinate position of a line of sight on the basis of the extracted information.

When the extracted characteristic points have sufficiently high reliability, the CPU 100 determines that the line of sight detection is possible, and turns on the line of sight mark 24a (FIGS. 1A and 1B) in the finder lower portion LCD. Thereafter, the CPU 100 selects a focus detection sensor and a photometric sensor in accordance with the detected coordinate position of the line of sight.

When the extracted characteristic points have low reliability, the CPU 100 determines that the line of sight detection is impossible, and flashes the line of sight mark 24a to inform the user that the detection is failured. At the same time, the CPU 100 estimates the cause of the failure of detection, and indicates the estimation result (70 in FIG. 1A) in the finder, thus suggesting a countermeasure to the user.

Figure 9A:
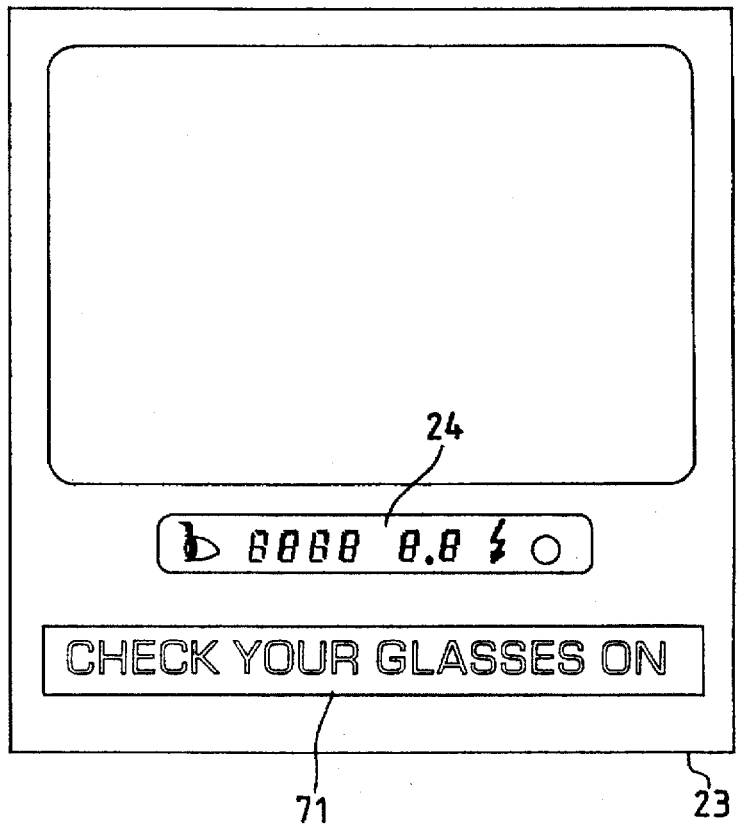
FIGS. 9A and 9B are views for explaining the second embodiment of an indication mode (finder indication of a camera) according to the present invention.
Figure 9B:
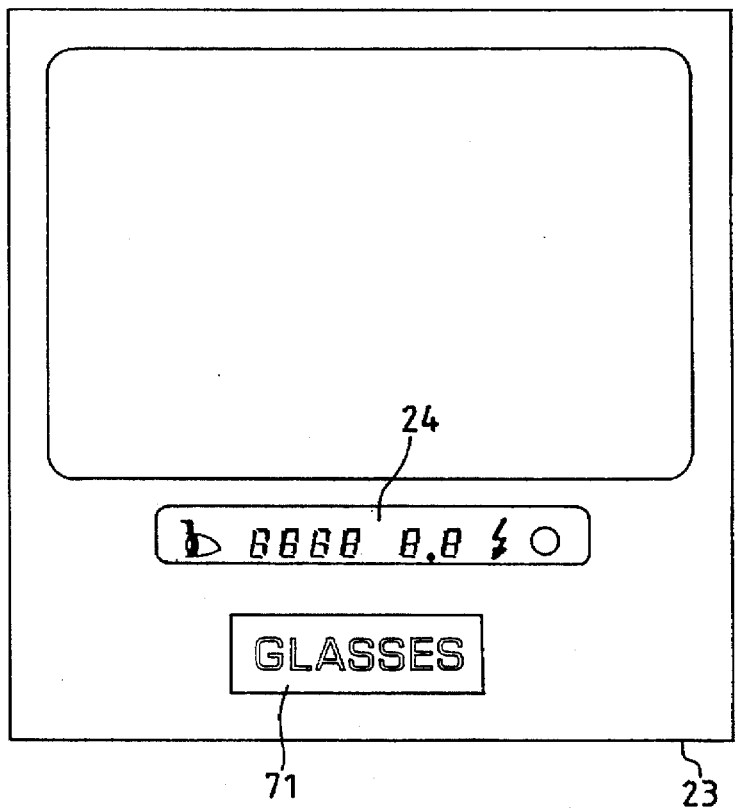

FIGS. 9A and 9B show the second embodiment of the present invention.

FIGS. 9A and 9B show another display method. In FIGS. 1A and 1B of the first embodiment, a message is superimposed in the finder. However, in this embodiment, a 7-segment indicator 71 is arranged below the finder lower portion LCD 24.

When the indicator comprises an LCD, a backlight illumination (not shown) is required.

In place of the LCD, for example, a 7-segment LED indicator may be arranged.

In the embodiment shown in FIGS. 9A and 9B, the indicator is arranged below the finder lower portion LCD. However, if the space allows, the indicator may be arranged above or on the left or right side of the finder. Other portions are the same as those in the first embodiment.

Figure 10:
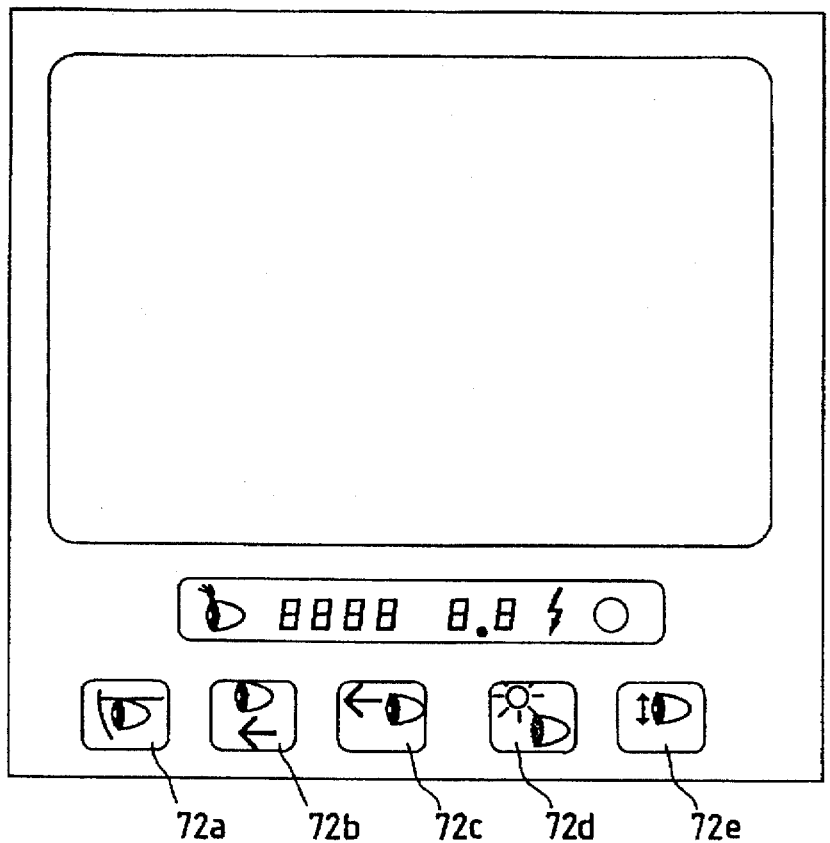
FIG. 10 is a view for explaining the third embodiment of an indication mode (finder indication of a camera) according to the present invention.

FIG. 10 shows the third embodiment of the present invention.

FIG. 10 shows still another display method. A plurality of symbols 72a to 72e are indicated below the finder lower portion LCD 24.

The indicators of such symbols may be realized by any of LCDs, LEDs, or mechanical means. The symbols 72a, 72b, 72c, 72d, and 72e respectively correspond to messages "CHECK YOUR GLASSES ON", "PUT YOUR EYES ON", "MAKE SURE THAT YOUR EYES ARE IN PLACE", "SHADE FROM THE SUN", and "OPEN YOUR EYES MUCH MORE".

In FIG. 10, the symbol indicators are arranged below the finder lower portion LCD. However, the positions of the indicators are not limited to a portion below the finder lower portion LCD. For example, these symbols may be arranged above or on the right or left side of the finder, or may be superimposed in the finder. Other portions are the same as those in the first embodiment.

Figure 11:
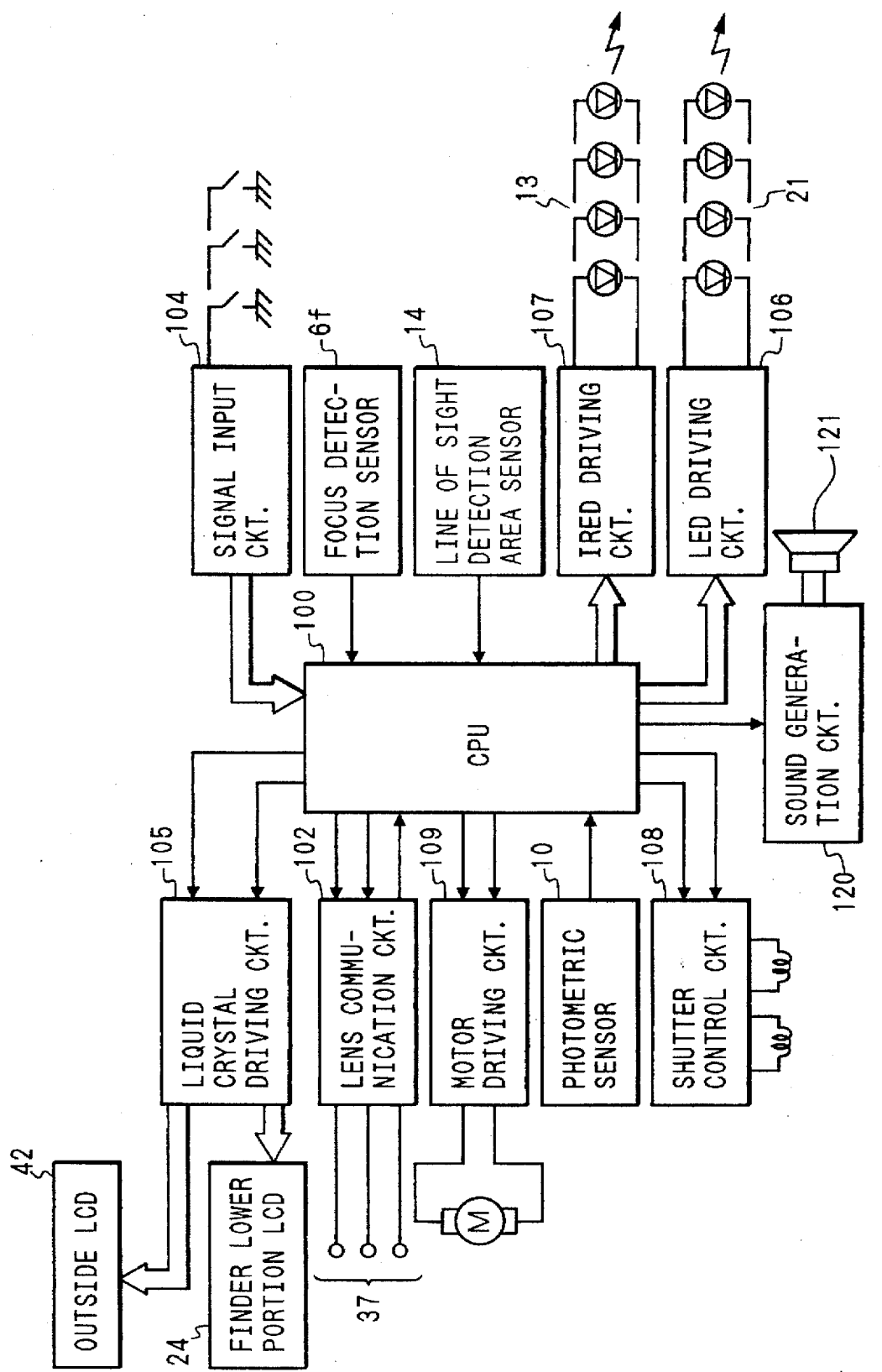
FIG. 11 is a circuit diagram showing an electrical circuit according to the third embodiment of the present invention.

FIG. 11 shows the fourth embodiment of the present invention.

FIG. 11 is a circuit diagram showing the electrical circuit of a camera which generates a sound instruction in place of a visual indication.

A sound generation circuit 120 is connected to the CPU 100. A loudspeaker 121 is connected to the sound generation circuit 120. The CPU 100 pre-stores a plurality of sound data. When line of sight detection is impossible, the CPU 100 estimates the cause of the impossible line of sight detection, and sends sound data corresponding to a method of removing the cause to the sound generation circuit, thus producing a sound instruction.

Since the number of characters is not particularly limited in the case of sound data, more accurate information can be presented to a user as compared to LCD indications.

In the above description, the present invention is applied to a single-lens reflex camera. The present invention is not limited to the single-lens reflex camera, but may be effectively applied to a lens shutter camera. Furthermore, the present invention may be effectively applied to an optical equipment such as a video camera, a man-machine interface equipment which includes a line of sight detecting device, an equipment for assisting handicapped persons, and the like.

In particular, since the video camera incorporates an electronic viewfinder, the indications of a character message, symbol, or the like in each of the first, second, and third embodiments of the present invention can be realized without adding any extra device.

Figure 12:
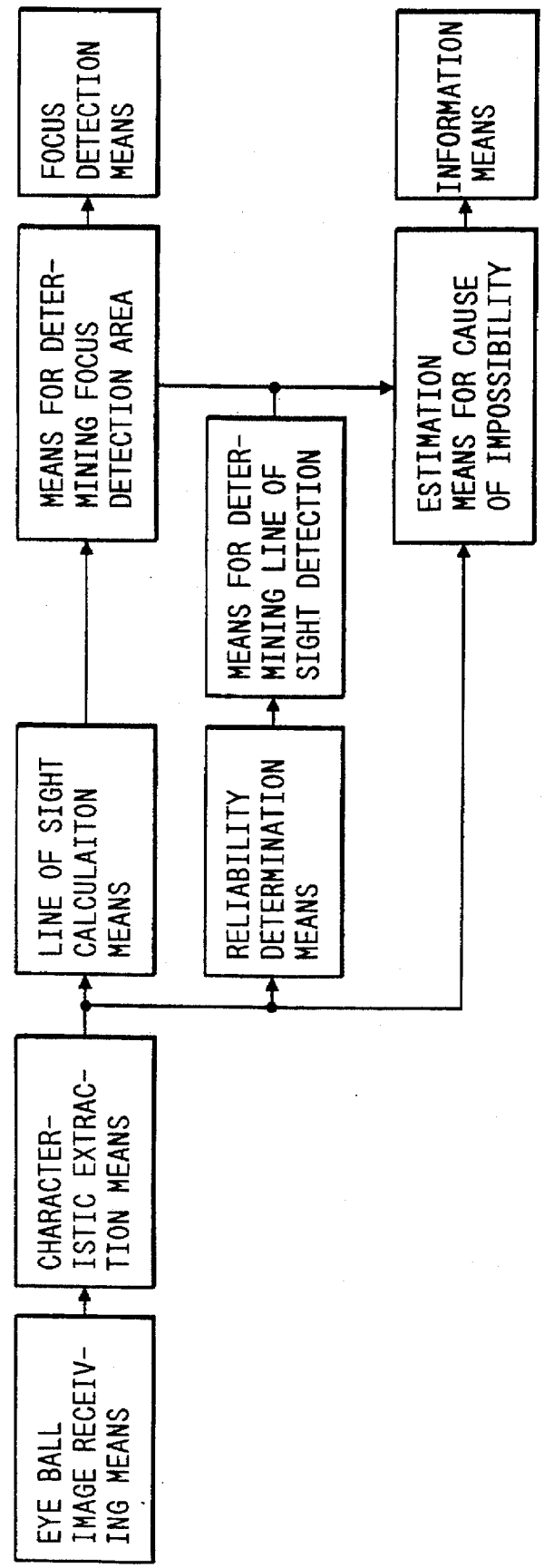
FIG. 12 is a block diagram showing the arrangement of the present invention.

FIG. 12 shows functional blocks of the present invention as a summary.

Eye ball image receiving means picks up an image of the eye ball of an observer, and outputs an eye ball image signal.

Characteristic extraction means receives an image signal from the eye ball image receiving means, and extracts characteristic points such as the pupil and corneal reflection images of an IRED for illumination in the image signal.

Line of sight calculation means calculates the line of sight of the observer on the basis of the characteristic information from the characteristic extraction means.

At the same time, reliability determination means determines the reliability of the line of sight calculation result by the line of sight calculation means on the basis of the characteristic information from the characteristic extraction means.

If the reliability is sufficiently high, means for determining line of sight detection determines that the line of sight detection is successful. The line of sight information of the observer calculated by the line of sight calculation means is used for selecting one of a plurality of focus detection areas, and focus detection means executes a focus detection operation on the basis of the selection result.

If the reliability is not sufficient, the means for determining line of sight determines that the line of sight detection has failed. In this case, determination (estimation) means for cause of impossibility estimates the cause of the failure of detection (impossibility) on the basis of characteristic image information from the characteristic extraction means upon receiving the determination result indicating that the line of sight detection is impossible.

Indication means generates predetermined information in correspondence with the estimation result, and suggests a method of removing the cause to the user.

As described above, according to the present invention, when line of sight detection is disabled, not only a message indicating that line of sight detection is impossible is provided, but also the cause of impossible detection or a method of removing the cause is visually or audibly provided, thus suggesting the cause of impossible line of sight detection and the method of removing the cause to an observer or a user. Therefore, even when line of sight detection is impossible, the observer or user can quickly remove the cause of impossible detection, and can improve the percentage of success of line of sight detection.

What is claimed is:

1. A device for detecting a line of sight of an observer who observes an object through a view finder, said device comprising:
   a) detection means for detecting the line of sight;
   b) determination means for determining whether or not a line of sight detection is successful;
   c) estimation means for estimating a cause of a failure of line of sight detection when said determination means determines that the line of sight detection failed; and
   d) notification means for providing the observer with a notification in the view finder which indicates the cause of the failure of line of sight detection estimated by said estimation means.

2. A line of sight detecting device according to claim 1, wherein said notification means indicates characters on an indication device.

3. A line of sight detecting device according to claim 2, wherein said indication device comprises a liquid crystal display device.

4. A line of sight detecting device according to claim 1, wherein said notification means indicates a predetermined symbol on an indication device.

5. A line of sight detecting device according to claim 1, wherein said detection means comprises light receiving means for receiving an eye ball image, and processing means for processing a signal output from said light receiving means.

6. A line of sight detecting device according to claim 5, wherein said determination means determines, based on the eye ball image received by said light receiving means, whether the line of sight detection meets with success or failure.

7. A line of sight detecting device according to claim 6, wherein said determination means determines, based on a luminance distribution of the eye ball image received by said light receiving means whether line of sight detection is successful or not.

8. A device for detecting a line of sight of an observer who observes an object through a view finder, said device comprising:
   a) illumination means for illuminating an eye ball;
   b) light receiving means for receiving an eye ball image illuminated by said illumination means;
   c) characteristic image extraction means for extracting a characteristic image from the eye ball image received by said light receiving means;
   d) calculation means for calculating a line of sight on the basis of said characteristic image;
   e) determination means for determining reliability of a line of sight detection result on the basis of said characteristic image;
   f) estimation means for, when said determination means determines that said reliability is low, estimating a cause of said low reliability; and
   g) notification means for providing the observer with a notification in the view finder which indicates the cause of said low reliability estimated by said estimation means.

9. A line of sight detecting device according to claim 8, wherein said estimation means estimates the cause of said low reliability on the basis of a luminance distribution of the eye ball image received by said light receiving means.

10. A line of sight detecting device according to claim 8, wherein said estimation means estimates the cause of said low reliability on the basis of a pupil image received by said light receiving means.

11. A line of sight detecting device according to claim 9, wherein a corneal reflection image is formed in the eye ball image upon illumination of the eye ball by said illumination means, and said estimation means estimates the cause of said low reliability on the basis of said corneal reflection image received by said light receiving means.

12. A line of sight detecting device according to claim 8, wherein said characteristic image includes a pupil image and a corneal reflection image formed on the eye ball by said illumination means.

13. A line of sight detecting device according to claim 8, wherein said estimation means estimates the cause of the failure of the line of sight detection on the basis of said characteristic image.

14. A line of sight detecting device according to claim 12, wherein said calculation means calculates the line of sight on the basis of a relative positional relationship between said pupil image and said corneal reflection image.

15. A line of sight detecting device according to claim 8, wherein a plurality of said illumination means are provided, and said estimation means estimates the cause of said low reliability on the basis of a relative positional relationship between a plurality of corneal reflection images formed by said plurality of illumination means.

16. A line of sight detecting device according to claim 8, wherein said characteristic image extraction means extracts said characteristic image on the basis of a luminance difference of the eye ball image received by said light receiving means.

17. A line of sight detecting device according to claim 8, wherein said notification means indicates characters on an indication device.

18. A line of sight detecting device according to claim 17, wherein said indication device comprised a liquid crystal display device.

19. A line of sight detecting device according to claim 8, wherein said notification means indicates a predetermined symbol on an indication device.

20. An apparatus having a line of sight detecting device, comprising:
   a view finder for observing an object;
   detection means for detecting the line of sight of an observer who is observing an object through said view finder;
   control means for controlling a predetermined operation in accordance with a line of sight detection result;

determination means for determining whether line of sight detection meets with success or failure;

estimation means for estimating a cause of a failure of line of sight detection when said determination means determines that the line of sight detection failed; and notification means for providing the observer with a notification in said view finder which indicates the cause of the failure of line of sight detection estimated by said estimation means.

21. An apparatus having a line of sight detecting device according to claim 20, wherein said notification means indicates characters on an indication device.

22. An apparatus having a line of sight detecting device according to claim 21, wherein said notification device comprises a liquid crystal display device.

23. An apparatus having a line of sight detecting device according to claim 20, wherein said notification means indicates a predetermined symbol on an indication device.

24. An apparatus having a line of sight detecting device according to claim 20, wherein said detection means comprises light receiving means for receiving an eye ball image and processing means for processing a signal output from said light receiving means.

25. An apparatus having a line of sight detecting device according to claim 24, wherein said determination means determines, based on the eye ball image received by said light receiving means, whether the line of sight detection meets with success or failure.

26. An apparatus having a line of sight detecting device according to claim 25, wherein said determination means determines, based on a luminance distribution of the eye ball image received by said light receiving means, whether the line of sight detection meets with success or failure.

27. An apparatus having a line of sight detecting device according to claim 25, wherein said determination means determines, based on a pupil image received by said light receiving means, whether the line of sight detection meets with success or failure.

28. An apparatus having a line of sight detecting device according to claim 24, wherein said detection means further comprises illumination means for illuminating the eye ball to form a corneal reflection image in said eye ball image, and said estimation means estimates the cause of the failure of line of sight detection on the basis of said corneal reflection image.

29. An apparatus having a line of sight detecting device according to claim 28, wherein a plurality of said illumination means are provided, and said estimation means estimates the cause of the failure of line of sight detection on the basis of a relative positional relationship between a plurality of corneal reflection images formed by said plurality of illumination means.

30. A device for detecting a line of sight of an observer who observes an object through a view finder, said device comprising:

a) detection means for detecting a line of sight by receiving an eye ball image; and b) indication means for indicating information in the view finder associated with a detection accuracy of said detection means, said indication means being capable of indicating one of a plurality of indications which correspond to the causes of the detection accuracy of said detection means.

31. A line of sight detecting device according to claim 30, wherein said indication means changes the contents of said indication on the basis of the eye ball image received by said detection means.

32. A line of sight detecting device according to claim 30, wherein said indication means changes the contents of said indication on the basis of a luminance distribution of the eye ball image received by said detection means.

33. A line of sight detecting device according to claim 30, wherein said indication means changes the contents of said indication on the basis of a pupil image in the eye ball image received by said detection means.

34. A line of sight detecting device according to claim 30, wherein said detection means comprises illumination means for illuminating the eye ball to form a corneal reflection image in said eye ball image, and said indication means changes the contents of said indication on the basis of said corneal reflection image received by said detection means.

35. A device according to claim 1, wherein said notification means provides the observer with a notification which indicates any one of a plurality of causes of failure of the line of sight detection.

36. A device according to claim 8, wherein said notification means provides the observer with a notification which indicates any one of a plurality of causes of failure of the line of sight detection.

37. Apparatus according to claim 20, wherein said notification means provides the observer with notification which indicates at least one of a plurality of causes of the failure of line of sight detection.

38. A device according to claim 30, further comprising means for detecting a failure of said detection means, and for determining at least one of a plurality of causes of said failure, and wherein said indication means provides an indication of at least one of the plurality of causes of failure detected by said means for detecting a failure.

* * * * *

UNITED STATES PATENT AND TRADEMARK OFFICE
CERTIFICATE OF CORRECTION

PATENT NO. :  5,694,623             Page 1 of 2
DATED      :  December 2, 1997
INVENTOR(S):  AKIRA AKASHI It is certified that error appears in the above-identified patent and that said Letters Patent is hereby corrected as shown below:

COLUMN 1:

Line 16, "appln. Ser." should read --Appln.--.

COLUMN 2:

Line 60, "principal part" should read --a principle portion--.

COLUMN 4:

Line 56, "FIG. 8," should read --FIG. 6,--; and
    Line 64, "principal part" should read --a principle portion--.

COLUMN 7:

Line 38, "is failured." should read --has failed.--.

COLUMN 9:

Line 56, "means" should read --means,--.

UNITED STATES PATENT AND TRADEMARK OFFICE
CERTIFICATE OF CORRECTION

PATENT NO. : 5,694,623
DATED : December 2, 1997
INVENTOR(S) : AKIRA AKASHI

It is certified that error appears in the above-identified patent and that said Letters Patent is hereby corrected as shown below:

COLUMN 10:

Line 21, "claim 9," should read --claim 8,--; and

Line 54, "comprised" should read --comprises--.

Signed and Sealed this

Sixteenth Day of June, 1998

Attest:

BRUCE LEHMAN

*Attesting Officer*     *Commissioner of Patents and Trademarks*